United States Patent
Ackley (10) Patent No.: US 9,477,854 B2
(45) Date of Patent: *Oct. 25, 2016

(54) SYSTEM AND METHOD FOR DETECTING BARCODE PRINTING ERRORS

(71) Applicant: Hand Held Products, Inc., Fort Mill, SC (US)

(72) Inventor: H. Sprague Ackley, Seattle, WA (US)

(73) Assignee: Hand Held Products, Inc., Fort Mill, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/986,746

(22) Filed: Jan. 4, 2016

(65) Prior Publication Data

US 2016/0188914 A1    Jun. 30, 2016

Related U.S. Application Data

(63) Continuation of application No. 14/596,757, filed on Jan. 14, 2015, now Pat. No. 9,230,140.

(60) Provisional application No. 62/098,174, filed on Dec. 30, 2014.

(51) Int. Cl.
*G06K 9/00* (2006.01)
*G06K 5/02* (2006.01)

(52) U.S. Cl.
CPC ..................................... *G06K 5/02* (2013.01)

(58) Field of Classification Search
USPC ................................ 235/375, 462.01; 347/19
See application file for complete search history.

(56) References Cited

U.S. PATENT DOCUMENTS 9,230,140 B1 *    1/2016    Ackley ................... G06K 5/02

FOREIGN PATENT DOCUMENTS

GB            2435338 A        8/2007

OTHER PUBLICATIONS

European Extended Search Report in related EP Application No. 15200617.7, Dated May 24, 2016, 8 pages.

* cited by examiner

*Primary Examiner* — Christle I Marshall
(74) *Attorney, Agent, or Firm* — Additon, Higgins & Pendleton, P.A.

(57) ABSTRACT

Barcode verifiers automate the verification process by capturing an image of the printed barcode and analyzing the image according to an industry specification. Industry specifications (e.g., ISO/IEC 15416,15415) identify common printing errors and prescribe test methods for detecting and quantifying these errors. Typically, these tests sample a barcode along one or more scan lines. Print errors that are parallel to these scan lines may be missed by the test. The present invention embraces a system and method to detect unprinted lines in barcodes resulting from a printer malfunction and produce a printer malfunction report with information regarding the quantity, position, and magnitude of these print errors.

20 Claims, 5 Drawing Sheets

SYSTEM AND METHOD FOR DETECTING BARCODE PRINTING ERRORS

CROSS-REFERENCE TO RELATED APPLICATIONS

The present application claims the benefit of U.S. patent application Ser. No. 14/596,757 for a System and Method for Detecting Barcode Printing Errors filed Jan. 14, 2015, now U.S. Pat. No. 9,230,140, which claims the benefit of U.S. Patent Application No. 62/098,174 for a System and Method for Detecting Barcode Printing Errors filed Dec. 30, 2014. Each of the foregoing patent applications and patent is hereby incorporated by reference in its entirety.

FIELD OF THE INVENTION

The present invention relates to barcode verifiers and more specifically to a system and method for optically detecting a barcode printing error and generating a printer malfunction report.

BACKGROUND

When printing barcodes, it is important to insure that each barcode can be read (i.e., scanned) by various barcode scanners in a wide range of scanning environments. As a result, industry standards for barcodes have been created to help insure that different scanners operating in different environments can read the same barcode.

Barcode verifiers capture an image of a barcode and analyze the barcode symbol according to test methods prescribed by the industry standards. The barcode verifiers can report the results of these tests and can alert an operator of problems.

The tests often prescribe sampling a barcode symbol at various locations in order to estimate a quality for the entire barcode symbol. For example a linear barcode, which has dark, variable-width barcode bars aligned in parallel and spaced by light, variable-width barcode spaces, may be sampled along parallel lines transverse to the barcode bar/spaces (i.e., along scan lines). Sampling the barcode in this way may cause the barcode verifier to miss certain printing errors that appear parallel to the scan lines. Printing errors of this sort may be common to many barcode printers.

Barcode printers typically use print heads to print a barcode. The print heads in ink jet printers, dot matrix printers, and thermal printers have a linear array of print elements (i.e., dots) to facilitate printing. Printed barcodes are printed dot-by-dot as paper is fed through the printer. When one print element becomes inoperative (e.g., clogged, stuck, burned-out, etc.) an unprinted line (i.e., gap) may appear in the printed barcode symbol. Since these unprinted lines are formed parallel to the test sampling lines (i.e., along the scan line direction), they may go unnoticed.

Therefore, a need exists for barcode verifier that can detect an unprinted line (or lines) in a barcode symbol along the scan line direction and generate a printer malfunction report.

SUMMARY

Accordingly, in one aspect, the present invention embraces a barcode verifier. The barcode verifier includes an imaging module for capturing images of a field of view. The barcode verifier also includes a memory that is communicatively coupled to the imaging module. The memory stores images and a barcode quality verification program. A processor is communicatively coupled to the memory and configured by the barcode quality verification program to create a printer malfunction report by executing a series of ordered steps. The first step is retrieving a stored image from the memory. Next, a barcode symbol is located in the stored image and an unprinted line (or lines) in the barcode symbol is identified. Using the unprinted line (or lines), a printer malfunction is determined, and finally, the processor executes the step of creating the printer malfunction report.

In an exemplary embodiment of the barcode verifier, the step of locating a barcode symbol in the stored image includes creating a box surrounding the barcode symbol in the stored image. The box includes a top edge and a bottom edge. For one-dimensional (1D) barcode symbologies, the top and bottom edges are lines formed from points located at the ends of the bars. These lines are typically perpendicular to the bars. For two-dimensional (2D) symbologies, the top and bottom lines are found in a similar fashion but use modules in the barcode symbol rather than points at the ends of bars. In some symbologies, lines are included as part of the symbol (e.g., the bottom edge of a data matrix) and may be used to help located the barcode symbol. Optionally a left and right edge of the barcode symbol may be found and included as part of the box.

In another exemplary embodiment of the barcode verifier, a box surrounding the barcode symbol in the stored image is created. The box includes a top edge, a bottom edge, a left edge, and a right edge. The step of identifying an unprinted line in the barcode symbol includes (i) detecting gaps in the barcode symbol, (ii) connecting the detected gaps to form a line, and (iii) identifying a line as an unprinted line if the line is aligned within a reasonable percentage (e.g., 5 percent) of the top or bottom edge of the box.

In another exemplary embodiment of the barcode verifier, a box surrounding the barcode symbol in the stored image is created, gaps in the barcode symbol are detected, and the step of determining a printer malfunction includes calculating the thickness of the gaps relative to the length of an edge of the box or relative to the smallest gap.

In another exemplary embodiment of the barcode verifier, a box surrounding the barcode symbol in the stored image is created, an unprinted line (or lines) is identified, and the step of determining a printer malfunction includes locating the position of each unprinted line relative to the top or bottom edge of the box.

In another exemplary embodiment of the barcode verifier, the step of determining a printer malfunction using the unprinted line (or lines) includes counting the number of unprinted lines.

In another exemplary embodiment of the barcode verifier, the barcode verifier includes a graphical user interface for displaying information to a user. The graphical user interface is communicatively coupled to the processor and configured by the processor to display the printer malfunction report.

In another exemplary embodiment of the barcode verifier, the printer malfunction report is stored to the memory.

In another exemplary embodiment of the barcode verifier, the printer malfunction report includes (i) a printer malfunction alert, (ii) an unprinted-line quantity, (iii) the thickness of each unprinted line, and (iv) the location of each unprinted line.

In another aspect, the present invention embraces a method for generating a printer malfunction report from a barcode image. The method includes the step of using an optical device to capture an image of a barcode, having a plurality of barcode bars. Next, the method includes the steps of locating the barcode within the image and creating a box to surround the located barcode. The box created has (i) a top edge that is perpendicular to the barcode bars and aligned with the top of the barcode bars, and (ii) a bottom edge that is perpendicular to the barcode bars and aligned with the bottom of the barcode bars. After the box is created, the method includes the step of detecting unprinted gaps, indicative of a printer malfunction, along each barcode bar. If possible, the edges of the unprinted gaps are connected to form lines that are substantially parallel to the top or bottom edge of the box. Each line is formed with a thickness to fill the corresponding gaps. Next, the method includes the steps of counting the number of lines formed, measuring the thickness of each line, and locating each line with respect to a box edge. If at least one line is formed, then a printer malfunction report is generated. The printer malfunction report includes the number of lines formed, the thickness of each line, and the location of each line with respect to a box edge.

In an exemplary embodiment of the method, a line is considered substantially parallel to the top or bottom edge of the box when the angle between the line and either the top or the bottom edge of the box is less than five degrees.

In another exemplary embodiment of the method, the thickness of each line is measured in printer dot size.

In another exemplary embodiment of the method, the printer malfunction report includes a calculation of the number of adjacent print head elements that are malfunctioning based on the thickness of each line.

In another exemplary embodiment of the method, the printer malfunction report includes guidance for repairing the malfunction.

In another exemplary embodiment of the method, the printer malfunction report includes print quality measurements of the barcode related to industry standards.

In another exemplary embodiment of the method, the optical device is a barcode verifier.

In another exemplary embodiment of the method, the barcode verifier comprises a graphical user interface for displaying the printer malfunction report to a user.

In another exemplary embodiment of the method, the printer malfunction comprises an inoperative heating element in a print head for a thermal printer.

In another exemplary embodiment of the method, the printer malfunction comprises an inoperative jet in a print head for an inkjet printer.

In another exemplary embodiment of the method, the printer malfunction comprises an inoperative pin in a print head for a dot matrix printer.

In another exemplary embodiment of the method, the box created includes (i) a left edge that is parallel to the barcode bars and aligned with the outer edge of the first barcode bar; and (ii) a right edge that is parallel to the barcode bars and aligned with the outer edge of the last barcode bar.

In another aspect, the present invention embraces a barcode scanner for decoding barcodes and verifying barcodes. The barcode scanner includes an imaging module for capturing images of a label. The label includes a user-data barcode symbol encoded with user data and a printer-ID barcode symbol encoded with a printer identity. The barcode scanner also includes a memory that is communicatively coupled to the imaging module. The memory stores the image and a barcode quality verification program. A processor is communicatively coupled to the memory and configured by the barcode quality verification program to create a printer malfunction report by executing a series of ordered steps. The first step is retrieving the image from the memory. The second step is locating the user-data barcode symbol in the retrieved image. The third step is identifying unprinted dots in the user-data barcode symbol. The fourth step is determining a printer malfunction using the unprinted dots. The fifth step is locating the printer-ID barcode symbol in the image. The sixth step is decoding the printer-ID barcode symbol, and the seventh step is creating a printer malfunction report. The printer malfunction report includes the printer malfunction and the printer identity.

The foregoing illustrative summary, as well as other exemplary objectives and/or advantages of the invention, and the manner in which the same are accomplished, are further explained within the following detailed description and its accompanying drawings.

DETAILED DESCRIPTION

Figure 1A:
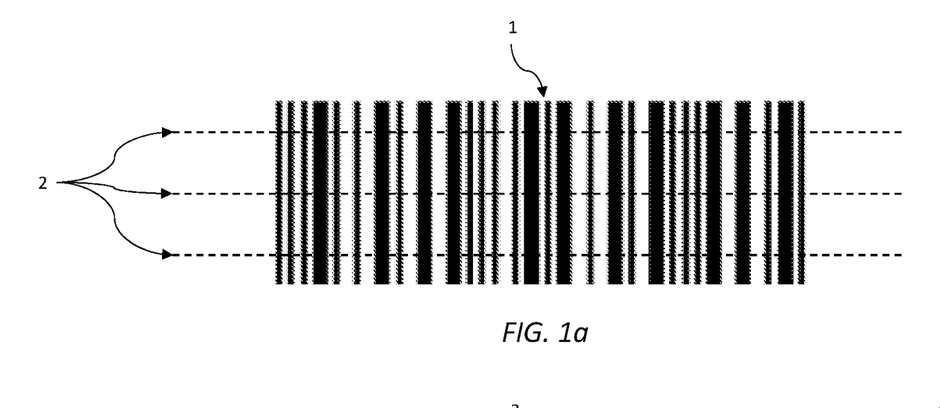
FIG. 1a graphically depicts an exemplary barcode symbol and exemplary scan lines.

The present invention embraces a barcode verifier for detecting print errors in a printed barcode. Barcodes are optical machine-readable representations of data. They may use one or two-dimensional patterns and may be black-and-white or color. One exemplary barcode, shown in FIG. 1, is a linear barcode 1 that includes dark barcode bars and light barcode spaces. The barcode bars and barcode spaces may be different widths to form various patterns. The barcode bars are elongated and are scanned along a scan line perpendicular to the elongated direction.

Scanning printed barcodes requires good print quality. To insure that a printed barcode will be properly scanned, this print quality must be evaluated. Industry standards such as ISO/IEC 15416 and ISO/IEC 15415 serve as guidelines for evaluating barcode quality. In these standards, various tests are described and grading criteria for the test results are established. A printed barcode may be tested to insure that it meets a minimum grade to insure that scan errors are minimized. This evaluation process may be automated with barcode verifiers.

Barcode verifiers are optical devices that capture and analyze images of barcodes. The analysis of an image typically requires the location and segmentation of a barcode symbol within the image. The barcode symbol is tested according to an array of tests specified by a selected standard. Often, additional non-graded parameters are also evaluated by the verifiers (e.g., ink spread) to facilitate additional process control. By monitoring the reports from the barcode verifiers, printing errors may be found and remedied with little loss and before delivering barcodes that are difficult or impossible to scan.

Automated testing of barcodes may not be perfect. Most quality control tests utilize samples to manage complexity while still providing a good estimate of the tested item's quality. In this way, barcode verifiers may sample a barcode by scanning the barcode symbol at various locations. FIG. 1a shows an exemplary barcode 1. A verifier may capture an image of a barcode 1 and analyze its quality along a sampling of scan lines 2. These scan lines may provide a good estimate of the print quality but may miss imperfections, especially when the imperfections are parallel to the scan lines 2.

Figure 1B:
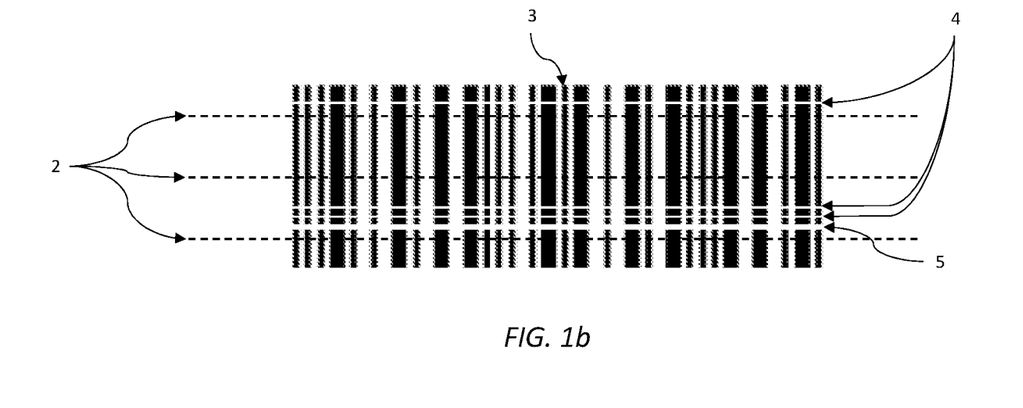
FIG. 1b graphically depicts exemplary scan lines and an exemplary barcode symbol having unprinted gaps in the barcode bars due to a printer malfunction.

FIG. 1b graphically depicts an exemplary barcode symbol with print errors 3. The unprinted gaps along each barcode bar may be due to a printer malfunction. These gaps combine to form unprinted lines 4,5 that run parallel to the scan lines 2. Here, the scan lines 2 in FIG. 1b do not encounter the unprinted lines 4,5. A verifier testing this barcode 3 with these scan lines 2 would not detect these printing errors.

The printing defects described so far are common to barcode printers. Barcodes printers may be Ink jet printers, dot matrix printers, or thermal printers. Each of these printers uses a print head. The print head has a linear array of print elements to form a printed mark (i.e., dot). The print elements print a barcode dot-by-dot as paper is fed through the printer and past the print head (which may also move during the printing process). When one print element in the print head becomes inoperative (e.g., clogged, stuck, burned-out, etc.) an unprinted gap may appear in each barcode bar. Due to the nature of the printing process, the gaps appear in each barcode bar at the same height. As a result, these gaps appear as an unprinted line in the barcode symbol running perpendicular to the barcode bar (i.e., parallel to a scan line). In some cases, multiple unprinted lines may occur due to multiple inoperative print head elements. These unprinted lines appear parallel to one another and are typically the same thickness (i.e., one dot), however sometimes, the gaps may be larger, forming thick lines. Thick lines are formed when adjacent print head elements are inoperative. In FIG. 1b the thick unprinted line 5 results from adjacent inoperative print head elements. By measuring line thickness and correlating this measurement to print head element size, the number of inoperative print head elements may be computed.

The present invention addresses the need for a system and method to detect the unprinted lines caused by a print head element malfunction. Such a system/method can generate a printer malfunction report to quantify these print errors. A printer malfunction report may include information regarding the number of unprinted lines, the location of the unprinted lines, and the thickness of each unprinted line. This information may be used to understand and remedy the print head malfunction causing the unprinted lines.

Existing barcode verifiers may assign a lower grade to barcodes with unprinted lines but this assignment is often random. In some cases, the verifier may detect the unprinted lines, while in other cases the verifier may not detect the unprinted lines. This variability leads to grading inconsistencies, and grading may not be repeatable. What is more, these barcode verifiers may detect the unprinted lines, but they cannot identify the printer malfunction or provide other information to help remedy it.

The present invention embraces an optical device that can report (i) the presence of an unprinted line, (ii) the cause of the unprinted line (i.e., printer malfunction), and (iii) explain the malfunction (e.g., number of inoperative print head elements). The optical device may be a barcode verifier or a barcode scanner configured to perform barcode verification.

Typical barcode scanners attempt to read barcode symbol data only (i.e., no verification). While hand-held scanners (e.g. 2D imagers) cannot perform full verification without some type of mounting and or lighting procedure, they can perform the analysis embraced by the present invention. A barcode scanner enabled with a barcode quality verification program can read a barcode symbol, evaluate missing lines, and create a maintenance report (i.e., printer malfunction report). Consequently, a barcode scanner can trigger an alert informing a user that a printer is close to failure before the printer produces unreadable barcodes.

The printer malfunction report described could take many forms. The report might be ordered data stored in memory and accessed by reporting software. For example, a printer malfunction report may enhance/support other barcode verifier tests/evaluations (e.g., ISO/IEC 15416 and/or 15415 tests). The printer malfunction report may also be part of a quality control process and provide alerts to an operator when a print head exhibited certain behavior (e.g., the number of unprinted lines exceeded a threshold). The printer malfunction report may be used by an operator to troubleshoot or diagnose a printer issue.

The printer malfunction report may be displayed by a graphical user interface (e.g. integrated with a barcode verifier) to display results to a human operator. The displayed results could comprise data from many barcode tests. The displayed results could allow an operator to monitor print head deterioration and replace the print head before any unreadable barcode symbols were printed.

Figure 2:
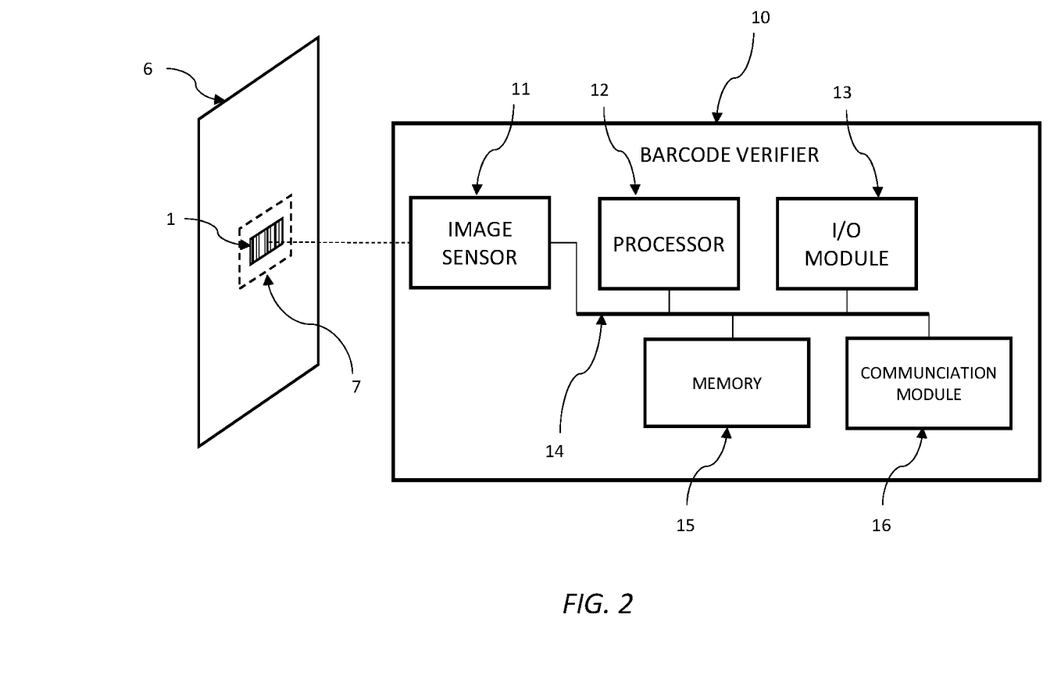
FIG. 2 schematically depicts a block diagram of a barcode verifier according to an embodiment of the present invention.

FIG. 2 schematically depicts a block diagram of a barcode verifier according to an embodiment of the present invention. The barcode verifier 10 captures an optical image of a barcode 1 within a field of view 7. The barcode is printed on a target item 6 (e.g., label, packaging, etc.). The barcode may be one-dimensional (e.g., linear barcode) or two-dimensional (e.g., Data Matrix, PDF417, Aztec Code, QR Code, etc.). The barcode verifier captures an image of the barcode using an image sensor 11. The image sensor 11 uses an imaging lens (or lenses) to form a real image of the field of view 7 on an array of photo sensors (e.g., CCD, CMOS sensor, etc.). Electronic signals from the photo sensors are used to create black-and-white or color images. The images are stored on a memory 15 (e.g., read-only memory (ROM), flash memory, a hard-drive, etc.) and may be recalled by a processor 12 for barcode verification.

The processor 12 is configured by a barcode quality verification program stored in memory 15 to analyze the barcode and create a printer malfunction report. The processor 12 is configured by the program to execute the steps of (i) retrieving a stored image from the memory, (ii) locating a barcode symbol in the stored image, (iii) identifying an unprinted line or lines in the barcode symbol, (iv) determining a printer malfunction using the unprinted line or lines, and (v) creating a printer malfunction report.

Figure 3:
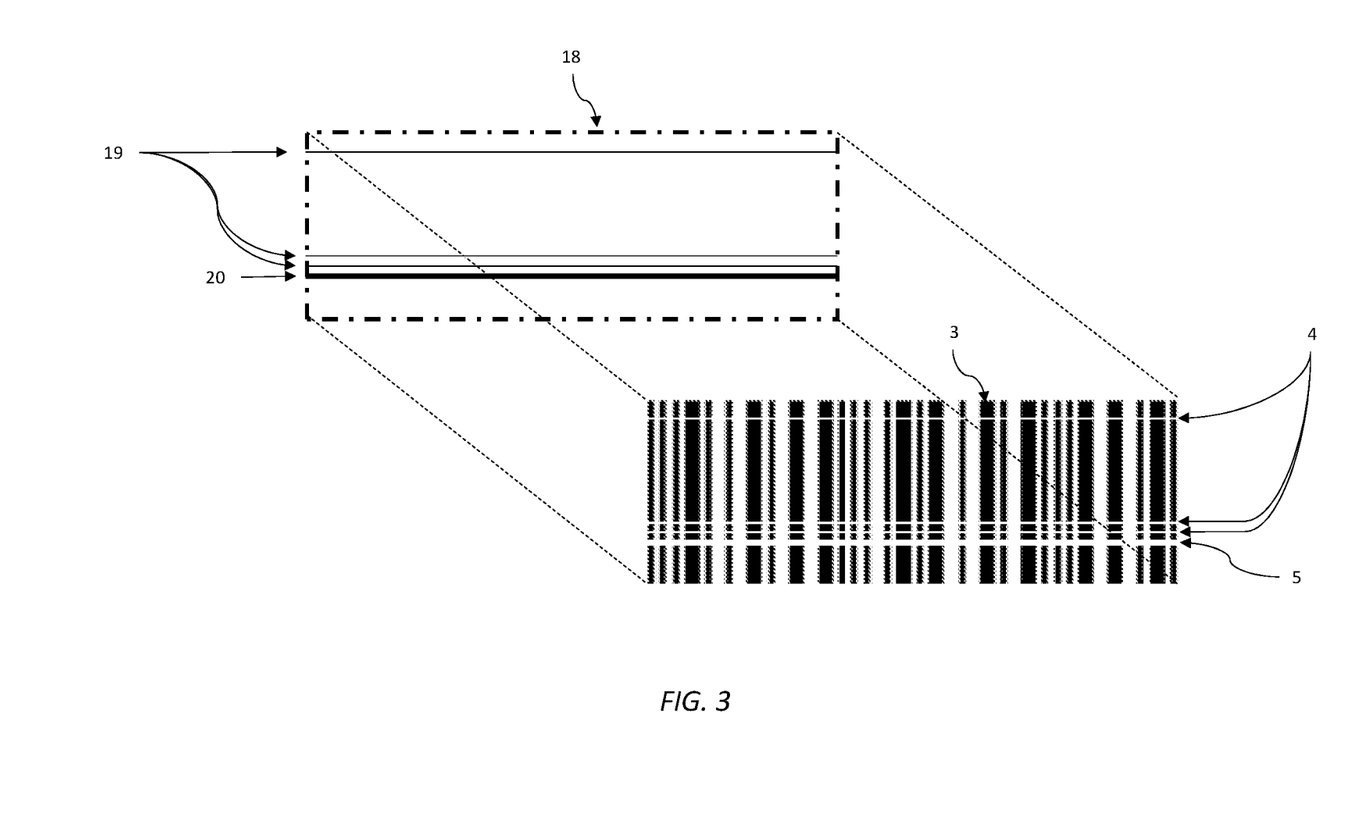
FIG. 3 graphically depicts an exemplary barcode symbol having unprinted gaps as well as the box and lines used in the creation of printer malfunction report.

In the step of locating a barcode symbol in the stored image, a box is created to surround the barcode symbol. FIG. 3 graphically depicts an exemplary barcode symbol 3 as well as the box 18. The program's step of identifying an unprinted line in the barcode symbol configures the processor to execute the steps of analyzing the image to (i) detect gaps in the barcode symbol 4,5 (i.e., gaps in each barcode bar), (ii) connect the detected gaps to form unprinted lines 19,20, and (iii) identifying a line as an unprinted line if the line is aligned within 5% of the top or bottom edge of the box. A line is aligned (i.e. parallel) within 5% of the top or bottom edge of the box if the angle formed between these line 19,20 and the top/bottom of the box 18 is less than five degrees (i.e., 5% of 90 degrees is roughly 5 degrees)

Once the box and the lines are created, the processor 12 may analyze the lines to create metrics reported in a printer malfunction report. One such metric is the number of lines. For the example shown in FIG. 3 there are four lines.

Another metric is line thickness. Line thickness may be expressed relative to a box dimension (e.g., percentage) or may be converted to a printer dot size. For the example shown in FIG. 3, there are three thin lines 19 (e.g., one dot) and on thick line 20.

Another metric computed may be line position. Thick lines may be processed to compute the number of adjacent print head elements that are malfunctioning. The position may be expressed relative to coordinate system created by the box (e.g., height from the bottom). Again, this may also be converter to printer dot size to correlate these numbers to the printer's print head.

The printer malfunction report may be stored in the memory 15 and communicated to a user via an input/output (I/O) module 13. The I/O module 13 may be integrated with the barcode verifier or a separate device that is communicatively coupled to the barcode verifier. In either case, the I/O module 13 may include a graphical user interface and may display visual and/or auditory information and receive information from a user (e.g., typed, touched, spoken, etc.).

In some embodiments, the barcode verifier 10 may communicatively connected using a communication module 16 to a computer or a network via a wired or wireless data link. In a wireless configuration, the communication module may communicate with a host device over the network via a variety of communication protocols (e.g., WI-FI®, BLUETOOTH®, CDMA, TDMA, or GSM).

The subsystems in the barcode verifier 10 are electrically connected via a couplers (e.g., wires, traces, etc.) to form an interconnection subsystem 14. The interconnection system 14 may include power buses or lines, data buses, instruction buses, address buses, etc., which allow operation of the modules/subsystems and the interaction there between.

Figure 4:
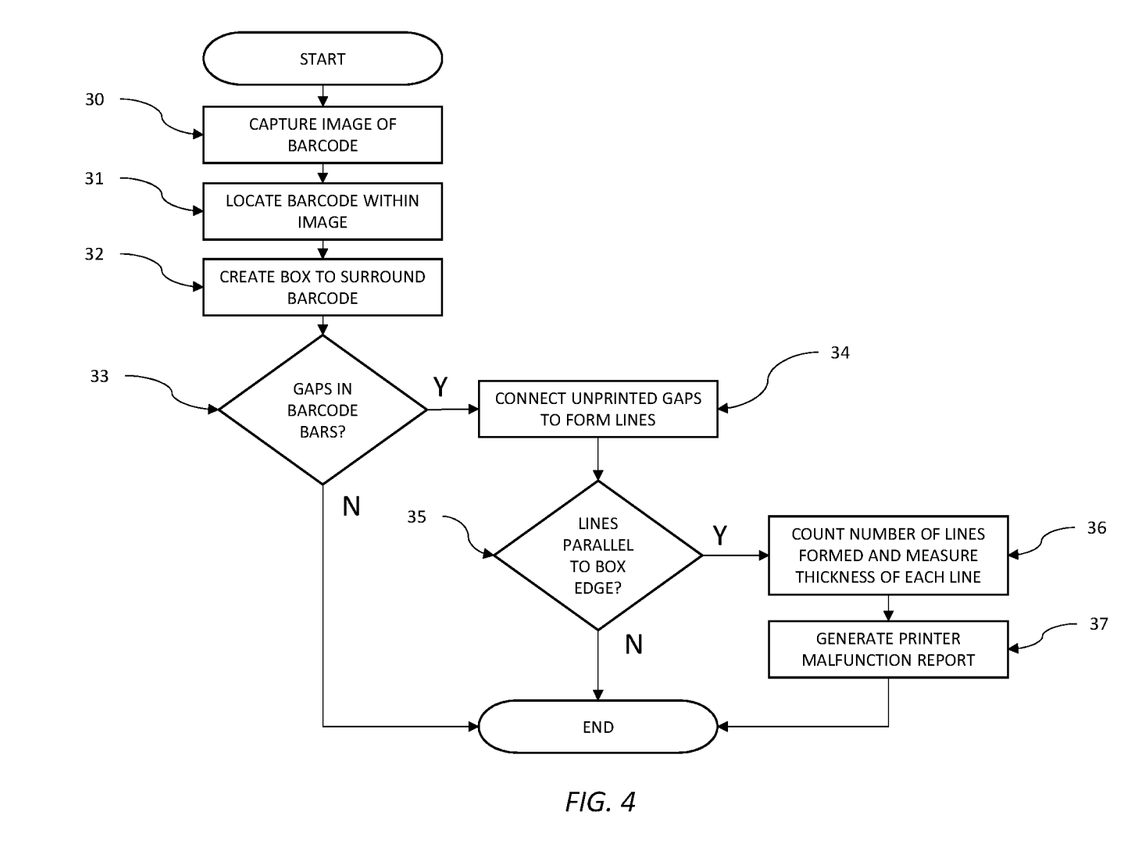
FIG. 4 schematically depicts a flowchart of an exemplary method for determining a printer malfunction from a barcode image.

FIG. 4 schematically depicts a flowchart of an exemplary method for determining a printer malfunction from a barcode image. The method begins by capturing an image of a barcode 30 (e.g., linear barcode) using an optical device (e.g., barcode verifier). Next, the barcode is located within the image of the barcode 31 and a box is created 32 to surround the spatial extent of the located barcode within the image. The barcode bars are then analyzed (e.g., edge detection) to find any unprinted gaps indicative of a printer malfunction. If no gaps are found then no printer malfunction is found and the process ends. If, however, gaps in the barcode bars are found 33, then the gaps are connected form lines within the box 34. Each line is created to fill the gaps so that the line thickness represents the gap size in the barcode bars. The lines formed are checked to insure that they are parallel to the box edge 35 (e.g., angle between lines and box top is less than five degrees). If the lines are not parallel then some other defect has caused the print error. If the lines are parallel 35 then the number of lines are counted and the thickness of each line is measured 36. Finally, a printer malfunction report including the number of lines formed, the thickness of each line, and the location of each line with respect to a box edge is generated 37.

In some embodiments, information regarding the printer that created a barcode symbol (i.e., the printer ID) may be encoded within a 1D or 2D barcode symbol printed on the same label as the barcode symbol containing user data. Here, the term label may represents any substrate carrying a symbol created by a printer. For example, a label may include a paper/plastic substrate onto which a barcode is printed. Alternatively, a label may include some faceplate material engraved with a barcode. Further, a label may be thought of as a barcode marked directly onto the surface of an item.

When a barcode scanner (or barcode verifier) detects unprinted dots (or lines) on a label, the printer ID symbol on the label may be decoded to identify the printer that created the printing error. This identification may facilitate service for the printer. Further error/printer data may be collected over time. Statistics may be applied to the collected data to aid in understanding the errors associated with a printer (or printers). This statistical information could be particularly helpful in, for example, creating repair and/or maintenance schedules for printers.

Figure 5:
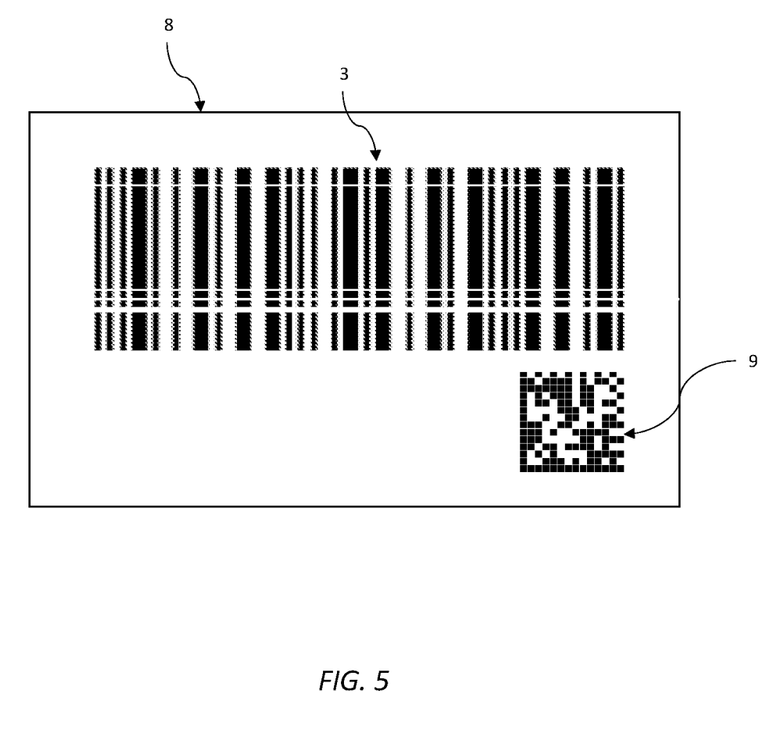
FIG. 5. graphically depicts an exemplary label with a user-data barcode symbol and a printer-ID barcode symbol.

An exemplary label 8 is shown in FIG. 5. The label includes two symbols. The first symbol is linear barcode 3 representing the user data (i.e., user-data barcode symbol). This first symbol is the symbol scanned by an application to perform a function (e.g., luggage identification). The second symbol on the label 8 is a printer identification barcode symbol (i.e., printer-ID barcode symbol) 9. The printer-ID barcode symbol 9 is encoded with the identity of the printer that printed the label (i.e., the printer identity).

The printer-ID barcode symbol 9 in FIG. 5 is a data matrix symbol encoded with a printer identity (e.g., "PRINTER 24"). The printer-ID barcode symbol 9 is used to identify the printer that created the label 8 to facilitate maintenance and/or repair functions. While printer errors may also affect the printer-ID barcode symbol 9, the present invention may report errors for these symbols as well as the user-data barcode symbol 3.

To supplement the present disclosure, this application incorporates entirely by reference the following commonly assigned patents, patent application publications, and patent applications:

U.S. Pat. No. 6,832,725; U.S. Pat. No. 7,128,266;
U.S. Pat. No. 7,159,783; U.S. Pat. No. 7,413,127;
U.S. Pat. No. 7,726,575; U.S. Pat. No. 8,294,969;
U.S. Pat. No. 8,317,105; U.S. Pat. No. 8,322,622;
U.S. Pat. No. 8,366,005; U.S. Pat. No. 8,371,507;
U.S. Pat. No. 8,376,233; U.S. Pat. No. 8,381,979;
U.S. Pat. No. 8,390,909; U.S. Pat. No. 8,408,464;
U.S. Pat. No. 8,408,468; U.S. Pat. No. 8,408,469;
U.S. Pat. No. 8,424,768; U.S. Pat. No. 8,448,863;
U.S. Pat. No. 8,457,013; U.S. Pat. No. 8,459,557;
U.S. Pat. No. 8,469,272; U.S. Pat. No. 8,474,712;
U.S. Pat. No. 8,479,992; U.S. Pat. No. 8,490,877;
U.S. Pat. No. 8,517,271; U.S. Pat. No. 8,523,076;
U.S. Pat. No. 8,528,818; U.S. Pat. No. 8,544,737;
U.S. Pat. No. 8,548,242; U.S. Pat. No. 8,548,420;
U.S. Pat. No. 8,550,335; U.S. Pat. No. 8,550,354;
U.S. Pat. No. 8,550,357; U.S. Pat. No. 8,556,174;
U.S. Pat. No. 8,556,176; U.S. Pat. No. 8,556,177;
U.S. Pat. No. 8,559,767; U.S. Pat. No. 8,599,957;
U.S. Pat. No. 8,561,895; U.S. Pat. No. 8,561,903;
U.S. Pat. No. 8,561,905; U.S. Pat. No. 8,565,107;
U.S. Pat. No. 8,571,307; U.S. Pat. No. 8,579,200;
U.S. Pat. No. 8,583,924; U.S. Pat. No. 8,584,945;
U.S. Pat. No. 8,587,595; U.S. Pat. No. 8,587,697;
U.S. Pat. No. 8,588,869; U.S. Pat. No. 8,590,789;
U.S. Pat. No. 8,596,539; U.S. Pat. No. 8,596,542;
U.S. Pat. No. 8,596,543; U.S. Pat. No. 8,599,271;
U.S. Pat. No. 8,599,957; U.S. Pat. No. 8,600,158;
U.S. Pat. No. 8,600,167; U.S. Pat. No. 8,602,309;
U.S. Pat. No. 8,608,053; U.S. Pat. No. 8,608,071;

U.S. Pat. No. 8,611,309; U.S. Pat. No. 8,615,487;
U.S. Pat. No. 8,616,454; U.S. Pat. No. 8,621,123;
U.S. Pat. No. 8,622,303; U.S. Pat. No. 8,628,013;
U.S. Pat. No. 8,628,015; U.S. Pat. No. 8,628,016;
U.S. Pat. No. 8,629,926; U.S. Pat. No. 8,630,491;
U.S. Pat. No. 8,635,309; U.S. Pat. No. 8,636,200;
U.S. Pat. No. 8,636,212; U.S. Pat. No. 8,636,215;
U.S. Pat. No. 8,636,224; U.S. Pat. No. 8,638,806;
U.S. Pat. No. 8,640,958; U.S. Pat. No. 8,640,960;
U.S. Pat. No. 8,643,717; U.S. Pat. No. 8,646,692;
U.S. Pat. No. 8,646,694; U.S. Pat. No. 8,657,200;
U.S. Pat. No. 8,659,397; U.S. Pat. No. 8,668,149;
U.S. Pat. No. 8,678,285; U.S. Pat. No. 8,678,286;
U.S. Pat. No. 8,682,077; U.S. Pat. No. 8,687,282;
U.S. Pat. No. 8,692,927; U.S. Pat. No. 8,695,880;
U.S. Pat. No. 8,698,949; U.S. Pat. No. 8,717,494;
U.S. Pat. No. 8,717,494; U.S. Pat. No. 8,720,783;
U.S. Pat. No. 8,723,804; U.S. Pat. No. 8,723,904;
U.S. Pat. No. 8,727,223; U.S. Pat. No. D702,237;
U.S. Pat. No. 8,740,082; U.S. Pat. No. 8,740,085;
U.S. Pat. No. 8,746,563; U.S. Pat. No. 8,750,445;
U.S. Pat. No. 8,752,766; U.S. Pat. No. 8,756,059;
U.S. Pat. No. 8,757,495; U.S. Pat. No. 8,760,563;
U.S. Pat. No. 8,763,909; U.S. Pat. No. 8,777,108;
U.S. Pat. No. 8,777,109; U.S. Pat. No. 8,779,898;
U.S. Pat. No. 8,781,520; U.S. Pat. No. 8,783,573;
U.S. Pat. No. 8,789,757; U.S. Pat. No. 8,789,758;
U.S. Pat. No. 8,789,759; U.S. Pat. No. 8,794,520;
U.S. Pat. No. 8,794,522; U.S. Pat. No. 8,794,526;
U.S. Pat. No. 8,798,367; U.S. Pat. No. 8,807,431;
U.S. Pat. No. 8,807,432; U.S. Pat. No. 8,820,630;
International Publication No. 2013/163789;
International Publication No. 2013/173985;
International Publication No. 2014/019130;
International Publication No. 2014/110495;
U.S. Patent Application Publication No. 2008/0185432;
U.S. Patent Application Publication No. 2009/0134221;
U.S. Patent Application Publication No. 2010/0177080;
U.S. Patent Application Publication No. 2010/0177076;
U.S. Patent Application Publication No. 2010/0177707;
U.S. Patent Application Publication No. 2010/0177749;
U.S. Patent Application Publication No. 2011/0202554;
U.S. Patent Application Publication No. 2012/0111946;
U.S. Patent Application Publication No. 2012/0138685;
U.S. Patent Application Publication No. 2012/0168511;
U.S. Patent Application Publication No. 2012/0168512;
U.S. Patent Application Publication No. 2012/0193423;
U.S. Patent Application Publication No. 2012/0203647;
U.S. Patent Application Publication No. 2012/0223141;
U.S. Patent Application Publication No. 2012/0228382;
U.S. Patent Application Publication No. 2012/0248188;
U.S. Patent Application Publication No. 2013/0043312;
U.S. Patent Application Publication No. 2013/0056285;
U.S. Patent Application Publication No. 2013/0070322;
U.S. Patent Application Publication No. 2013/0075168;
U.S. Patent Application Publication No. 2013/0082104;
U.S. Patent Application Publication No. 2013/0175341;
U.S. Patent Application Publication No. 2013/0175343;
U.S. Patent Application Publication No. 2013/0200158;
U.S. Patent Application Publication No. 2013/0256418;
U.S. Patent Application Publication No. 2013/0257744;
U.S. Patent Application Publication No. 2013/0257759;
U.S. Patent Application Publication No. 2013/0270346;
U.S. Patent Application Publication No. 2013/0278425;
U.S. Patent Application Publication No. 2013/0287258;
U.S. Patent Application Publication No. 2013/0292475;
U.S. Patent Application Publication No. 2013/0292477;
U.S. Patent Application Publication No. 2013/0293539;
U.S. Patent Application Publication No. 2013/0293540;
U.S. Patent Application Publication No. 2013/0306728;
U.S. Patent Application Publication No. 2013/0306730;
U.S. Patent Application Publication No. 2013/0306731;
U.S. Patent Application Publication No. 2013/0307964;
U.S. Patent Application Publication No. 2013/0308625;
U.S. Patent Application Publication No. 2013/0313324;
U.S. Patent Application Publication No. 2013/0313325;
U.S. Patent Application Publication No. 2013/0341399;
U.S. Patent Application Publication No. 2013/0342717;
U.S. Patent Application Publication No. 2014/0001267;
U.S. Patent Application Publication No. 2014/0002828;
U.S. Patent Application Publication No. 2014/0008430;
U.S. Patent Application Publication No. 2014/0008439;
U.S. Patent Application Publication No. 2014/0025584;
U.S. Patent Application Publication No. 2014/0027518;
U.S. Patent Application Publication No. 2014/0034734;
U.S. Patent Application Publication No. 2014/0036848;
U.S. Patent Application Publication No. 2014/0039693;
U.S. Patent Application Publication No. 2014/0042814;
U.S. Patent Application Publication No. 2014/0049120;
U.S. Patent Application Publication No. 2014/0049635;
U.S. Patent Application Publication No. 2014/0061305;
U.S. Patent Application Publication No. 2014/0061306;
U.S. Patent Application Publication No. 2014/0063289;
U.S. Patent Application Publication No. 2014/0066136;
U.S. Patent Application Publication No. 2014/0067692;
U.S. Patent Application Publication No. 2014/0070005;
U.S. Patent Application Publication No. 2014/0071840;
U.S. Patent Application Publication No. 2014/0074746;
U.S. Patent Application Publication No. 2014/0075846;
U.S. Patent Application Publication No. 2014/0076974;
U.S. Patent Application Publication No. 2014/0078341;
U.S. Patent Application Publication No. 2014/0078342;
U.S. Patent Application Publication No. 2014/0078345;
U.S. Patent Application Publication No. 2014/0084068;
U.S. Patent Application Publication No. 2014/0097249;
U.S. Patent Application Publication No. 2014/0098792;
U.S. Patent Application Publication No. 2014/0100774;
U.S. Patent Application Publication No. 2014/0100813;
U.S. Patent Application Publication No. 2014/0103115;
U.S. Patent Application Publication No. 2014/0104413;
U.S. Patent Application Publication No. 2014/0104414;
U.S. Patent Application Publication No. 2014/0104416;
U.S. Patent Application Publication No. 2014/0104451;
U.S. Patent Application Publication No. 2014/0106594;
U.S. Patent Application Publication No. 2014/0106725;
U.S. Patent Application Publication No. 2014/0108010;
U.S. Patent Application Publication No. 2014/0108402;
U.S. Patent Application Publication No. 2014/0108682;
U.S. Patent Application Publication No. 2014/0110485;
U.S. Patent Application Publication No. 2014/0114530;
U.S. Patent Application Publication No. 2014/0124577;
U.S. Patent Application Publication No. 2014/0124579;
U.S. Patent Application Publication No. 2014/0125842;
U.S. Patent Application Publication No. 2014/0125853;
U.S. Patent Application Publication No. 2014/0125999;
U.S. Patent Application Publication No. 2014/0129378;
U.S. Patent Application Publication No. 2014/0131438;
U.S. Patent Application Publication No. 2014/0131441;
U.S. Patent Application Publication No. 2014/0131443;
U.S. Patent Application Publication No. 2014/0131444;
U.S. Patent Application Publication No. 2014/0131445;
U.S. Patent Application Publication No. 2014/0131448;
U.S. Patent Application Publication No. 2014/0133379;
U.S. Patent Application Publication No. 2014/0136208;

U.S. Patent Application Publication No. 2014/0140585;
U.S. Patent Application Publication No. 2014/0151453;
U.S. Patent Application Publication No. 2014/0152882;
U.S. Patent Application Publication No. 2014/0158770;
U.S. Patent Application Publication No. 2014/0159869;
U.S. Patent Application Publication No. 2014/0160329;
U.S. Patent Application Publication No. 2014/0166755;
U.S. Patent Application Publication No. 2014/0166757;
U.S. Patent Application Publication No. 2014/0166759;
U.S. Patent Application Publication No. 2014/0166760;
U.S. Patent Application Publication No. 2014/0166761;
U.S. Patent Application Publication No. 2014/0168787;
U.S. Patent Application Publication No. 2014/0175165;
U.S. Patent Application Publication No. 2014/0175169;
U.S. Patent Application Publication No. 2014/0175172;
U.S. Patent Application Publication No. 2014/0175174;
U.S. Patent Application Publication No. 2014/0191644;
U.S. Patent Application Publication No. 2014/0191913;
U.S. Patent Application Publication No. 2014/0197238;
U.S. Patent Application Publication No. 2014/0197239;
U.S. Patent Application Publication No. 2014/0197304;
U.S. Patent Application Publication No. 2014/0203087;
U.S. Patent Application Publication No. 2014/0204268;
U.S. Patent Application Publication No. 2014/0214631;
U.S. Patent Application Publication No. 2014/0217166;
U.S. Patent Application Publication No. 2014/0217180;
U.S. patent application Ser. No. 13/367,978 for a Laser Scanning Module Employing an Elastomeric U-Hinge Based Laser Scanning Assembly, filed Feb. 7, 2012 (Feng et al.);
U.S. patent application Ser. No. 29/436,337 for an Electronic Device, filed Nov. 5, 2012 (Fitch et al.);
U.S. patent application Ser. No. 13/771,508 for an Optical Redirection Adapter, filed Feb. 20, 2013 (Anderson);
U.S. patent application Ser. No. 13/852,097 for a System and Method for Capturing and Preserving Vehicle Event Data, filed Mar. 28, 2013 (Barker et al.);
U.S. patent application Ser. No. 13/902,110 for a System and Method for Display of Information Using a Vehicle-Mount Computer, filed May 24, 2013 (Hollifield);
U.S. patent application Ser. No. 13/902,144, for a System and Method for Display of Information Using a Vehicle-Mount Computer, filed May 24, 2013 (Chamberlin);
U.S. patent application Ser. No. 13/902,242 for a System For Providing A Continuous Communication Link With A Symbol Reading Device, filed May 24, 2013 (Smith et al.);
U.S. patent application Ser. No. 13/912,262 for a Method of Error Correction for 3D Imaging Device, filed Jun. 7, 2013 (Jovanovski et al.);
U.S. patent application Ser. No. 13/912,702 for a System and Method for Reading Code Symbols at Long Range Using Source Power Control, filed Jun. 7, 2013 (Xian et al.);
U.S. patent application Ser. No. 29/458,405 for an Electronic Device, filed Jun. 19, 2013 (Fitch et al.);
U.S. patent application Ser. No. 13/922,339 for a System and Method for Reading Code Symbols Using a Variable Field of View, filed Jun. 20, 2013 (Xian et al.);
U.S. patent application Ser. No. 13/927,398 for a Code Symbol Reading System Having Adaptive Autofocus, filed Jun. 26, 2013 (Todeschini);
U.S. patent application Ser. No. 13/930,913 for a Mobile Device Having an Improved User Interface for Reading Code Symbols, filed Jun. 28, 2013 (Gelay et al.);
U.S. patent application Ser. No. 29/459,620 for an Electronic Device Enclosure, filed Jul. 2, 2013 (London et al.);
U.S. patent application Ser. No. 29/459,681 for an Electronic Device Enclosure, filed Jul. 2, 2013 (Chaney et al.);
U.S. patent application Ser. No. 13/933,415 for an Electronic Device Case, filed Jul. 2, 2013 (London et al.);
U.S. patent application No. 29/459,785 for a Scanner and Charging Base, filed Jul. 3, 2013 (Fitch et al.);
U.S. patent application No. 29/459,823 for a Scanner, filed Jul. 3, 2013 (Zhou et al.);
U.S. patent application Ser. No. 13/947,296 for a System and Method for Selectively Reading Code Symbols, filed Jul. 22, 2013 (Rueblinger et al.);
U.S. patent application Ser. No. 13/950,544 for a Code Symbol Reading System Having Adjustable Object Detection, filed Jul. 25, 2013 (Jiang);
U.S. patent application Ser. No. 13/961,408 for a Method for Manufacturing Laser Scanners, filed Aug. 7, 2013 (Saber et al.);
U.S. patent application Ser. No. 14/018,729 for a Method for Operating a Laser Scanner, filed Sep. 5, 2013 (Feng et al.);
U.S. patent application Ser. No. 14/019,616 for a Device Having Light Source to Reduce Surface Pathogens, filed Sep. 6, 2013 (Todeschini);
U.S. patent application Ser. No. 14/023,762 for a Handheld Indicia Reader Having Locking Endcap, filed Sep. 11, 2013 (Gannon);
U.S. patent application Ser. No. 14/035,474 for Augmented-Reality Signature Capture, filed Sep. 24, 2013 (Todeschini);
U.S. patent application No. 29/468,118 for an Electronic Device Case, filed Sep. 26, 2013 (Oberpriller et al.);
U.S. patent application Ser. No. 14/055,234 for Dimensioning System, filed Oct. 16, 2013 (Fletcher);
U.S. patent application Ser. No. 14/053,314 for Indicia Reader, filed Oct. 14, 2013 (Huck);
U.S. patent application Ser. No. 14/065,768 for Hybrid System and Method for Reading Indicia, filed Oct. 29, 2013 (Meier et al.);
U.S. patent application Ser. No. 14/074,746 for Self-Checkout Shopping System, filed Nov. 8, 2013 (Hejl et al.);
U.S. patent application Ser. No. 14/074,787 for Method and System for Configuring Mobile Devices via NFC Technology, filed Nov. 8, 2013 (Smith et al.);
U.S. patent application Ser. No. 14/087,190 for Optimal Range Indicators for Bar Code Validation, filed Nov. 22, 2013 (Hejl);
U.S. patent application Ser. No. 14/094,087 for Method and System for Communicating Information in an Digital Signal, filed Dec. 2, 2013 (Peake et al.);
U.S. patent application Ser. No. 14/101,965 for High Dynamic-Range Indicia Reading System, filed Dec. 10, 2013 (Xian);
U.S. patent application Ser. No. 14/150,393 for Indicia-reader Having Unitary Construction Scanner, filed Jan. 8, 2014 (Colavito et al.);
U.S. patent application Ser. No. 14/154,207 for Laser Barcode Scanner, filed Jan. 14, 2014 (Hou et al.);
U.S. patent application Ser. No. 14/165,980 for System and Method for Measuring Irregular Objects with a Single Camera filed Jan. 28, 2014 (Li et al.);
U.S. patent application Ser. No. 14/166,103 for Indicia Reading Terminal Including Optical Filter filed Jan. 28, 2014 (Lu et al.);
U.S. patent application Ser. No. 14/200,405 for Indicia Reader for Size-Limited Applications filed Mar. 7, 2014 (Feng et al.);

U.S. patent application Ser. No. 14/231,898 for Hand-Mounted Indicia-Reading Device with Finger Motion Triggering filed Apr. 1, 2014 (Van Horn et al.);

U.S. patent application Ser. No. 14/250,923 for Reading Apparatus Having Partial Frame Operating Mode filed Apr. 11, 2014, (Deng et al.);

U.S. patent application Ser. No. 14/257,174 for Imaging Terminal Having Data Compression filed Apr. 21, 2014, (Barber et al.);

U.S. patent application Ser. No. 14/257,364 for Docking System and Method Using Near Field Communication filed Apr. 21, 2014 (Showering);

U.S. patent application Ser. No. 14/264,173 for Autofocus Lens System for Indicia Readers filed Apr. 29, 2014 (Ackley et al.);

U.S. patent application Ser. No. 14/274,858 for Mobile Printer with Optional Battery Accessory filed May 12, 2014 (Marty et al.);

U.S. patent application Ser. No. 14/277,337 for MULTI-PURPOSE OPTICAL READER, filed May 14, 2014 (Jovanovski et al.);

U.S. patent application Ser. No. 14/283,282 for TERMINAL HAVING ILLUMINATION AND FOCUS CONTROL filed May 21, 2014 (Liu et al.);

U.S. patent application Ser. No. 14/300,276 for METHOD AND SYSTEM FOR CONSIDERING INFORMATION ABOUT AN EXPECTED RESPONSE WHEN PERFORMING SPEECH RECOGNITION, filed Jun. 10, 2014 (Braho et al.);

U.S. patent application Ser. No. 14/305,153 for INDICIA READING SYSTEM EMPLOYING DIGITAL GAIN CONTROL filed Jun. 16, 2014 (Xian et al.);

U.S. patent application Ser. No. 14/310,226 for AUTOFOCUSING OPTICAL IMAGING DEVICE filed Jun. 20, 2014 (Koziol et al.);

U.S. patent application Ser. No. 14/327,722 for CUSTOMER FACING IMAGING SYSTEMS AND METHODS FOR OBTAINING IMAGES filed Jul. 10, 2014 (Oberpriller et al,);

U.S. patent application Ser. No. 14/327,827 for a MOBILE-PHONE ADAPTER FOR ELECTRONIC TRANSACTIONS, filed Jul. 10, 2014 (Hejl);

U.S. patent application Ser. No. 14/329,303 for CELL PHONE READING MODE USING IMAGE TIMER filed Jul. 11, 2014 (Coyle);

U.S. patent application Ser. No. 14/333,588 for SYMBOL READING SYSTEM WITH INTEGRATED SCALE BASE filed Jul. 17, 2014 (Barten);

U.S. patent application Ser. No. 14/334,934 for a SYSTEM AND METHOD FOR INDICIA VERIFICATION, filed Jul. 18, 2014 (Hejl);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/339,708 for LASER SCANNING CODE SYMBOL READING SYSTEM, filed Jul. 24, 2014 (Xian et al.);

U.S. patent application Ser. No. 14/340,627 for an AXIALLY REINFORCED FLEXIBLE SCAN ELEMENT, filed Jul. 25, 2014 (Rueblinger et al.);

U.S. patent application Ser. No. 14/340,716 for an OPTICAL IMAGER AND METHOD FOR CORRELATING A MEDICATION PACKAGE WITH A PATIENT, filed Jul. 25, 2014 (Ellis);

U.S. patent application Ser. No. 14/342,544 for Imaging Based Barcode Scanner Engine with Multiple Elements Supported on a Common Printed Circuit Board filed Mar. 4, 2014 (Liu et al.);

U.S. patent application Ser. No. 14/345,735 for Optical Indicia Reading Terminal with Combined Illumination filed Mar. 19, 2014 (Ouyang);

U.S. patent application Ser. No. 14/336,188 for METHOD OF AND SYSTEM FOR DETECTING OBJECT WEIGHING INTERFERENCES, Filed Jul. 21, 2014 (Amundsen et al.);

U.S. patent application Ser. No. 14/355,613 for Optical Indicia Reading Terminal with Color Image Sensor filed May 1, 2014 (Lu et al.);

U.S. patent application Ser. No. 14/370,237 for WEB-BASED SCAN-TASK ENABLED SYSTEM AND METHOD OF AND APPARATUS FOR DEVELOPING AND DEPLOYING THE SAME ON A CLIENT-SERVER NETWORK filed Jul. 2, 2014 (Chen et al.);

U.S. patent application Ser. No. 14/370,267 for INDUSTRIAL DESIGN FOR CONSUMER DEVICE BASED SCANNING AND MOBILITY, filed Jul. 2, 2014 (Ma et al.);

U.S. patent application Ser. No. 14/376,472, for an ENCODED INFORMATION READING TERMINAL INCLUDING HTTP SERVER, filed Aug. 4, 2014 (Lu);

U.S. patent application Ser. No. 14/379,057 for METHOD OF USING CAMERA SENSOR INTERFACE TO TRANSFER MULTIPLE CHANNELS OF SCAN DATA USING AN IMAGE FORMAT filed Aug. 15, 2014 (Wang et al.);

U.S. patent application Ser. No. 14/452,697 for INTERACTIVE INDICIA READER, filed Aug. 6, 2014 (Todeschini);

U.S. patent application Ser. No. 14/453,019 for DIMENSIONING SYSTEM WITH GUIDED ALIGNMENT, filed Aug. 6, 2014 (Li et al.);

U.S. patent application Ser. No. 14/460,387 for APPARATUS FOR DISPLAYING BAR CODES FROM LIGHT EMITTING DISPLAY SURFACES filed Aug. 15, 2014 (Van Horn et al.);

U.S. patent application Ser. No. 14/460,829 for ENCODED INFORMATION READING TERMINAL WITH WIRELESS PATH SELECTION CAPABILITY, filed Aug. 15, 2014 (Wang et al.);

U.S. patent application Ser. No. 14/462,801 for MOBILE COMPUTING DEVICE WITH DATA COGNITION SOFTWARE, filed on Aug. 19, 2014 (Todeschini et al.);

U.S. patent application Ser. No. 14/446,387 for INDICIA READING TERMINAL PROCESSING PLURALITY OF FRAMES OF IMAGE DATA RESPONSIVELY TO TRIGGER SIGNAL ACTIVATION filed Jul. 30, 2014 (Wang et al.);

U.S. patent application Ser. No. 14/446,391 for MULTIFUNCTION POINT OF SALE APPARATUS WITH OPTICAL SIGNATURE CAPTURE filed Jul. 30, 2014 (Good et al.);

U.S. patent application No. 29/486,759 for an Imaging Terminal, filed Apr. 2, 2014 (Oberpriller et al.);

U.S. patent application No. 29/492,903 for an INDICIA SCANNER, filed Jun. 4, 2014 (Zhou et al.); and U.S. patent application No. 29/494,725 for an IN-COUNTER BARCODE SCANNER, filed Jun. 24, 2014 (Oberpriller et al.).

In the specification and/or figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The invention claimed is:

1. A barcode verifier, comprising:
an imaging module for capturing images of a field of view;
a memory communicatively coupled to the imaging module and configured to store images and a barcode quality verification program; and
a processor communicatively coupled to the memory configured by the barcode quality verification program to execute the ordered steps of:
(i) retrieving a stored image from the memory, (ii) identifying an unprinted line or lines in a barcode symbol in the image, (iii) determining a printer malfunction using the unprinted line or lines, and (iv) creating a printer malfunction report.

2. The barcode verifier according to claim 1, comprising creating a box surrounding the barcode symbol in the stored image, wherein the box comprises a top edge, a bottom edge, a left edge, and a right edge, each edge corresponding to a respective barcode symbol edge.

3. The barcode verifier according to claim 2, wherein the step of identifying an unprinted line in the barcode symbol comprises:
(i) detecting gaps in the barcode symbol, (ii) connecting the detected gaps to form a line, and (iii) identifying a line as an unprinted line if the line is aligned within 5% of the top or bottom edge.

4. The barcode verifier according to claim 3, wherein the step of determining a printer malfunction using the unprinted line or lines, comprises calculating a thickness of the gaps relative to a length of an edge of the box.

5. The barcode verifier according to claim 2, wherein the step of determining a printer malfunction using the unprinted line or lines, comprises locating the position of each unprinted line relative to the top or bottom edge of the box.

6. The barcode verifier according to claim 1, wherein the step of determining a printer malfunction using the unprinted line or lines, comprises counting the number of unprinted lines.

7. The barcode verifier according to claim 1, comprising a graphical user interface for displaying information to a user, the graphical user interface communicatively coupled to the processor and configured by the processor to display the printer malfunction report.

8. The barcode verifier according to claim 1, wherein the printer malfunction report comprises:
(i) a printer malfunction alert, (ii) an unprinted-line quantity, (iii) a thickness of each unprinted line, and (iv) a location of each unprinted line.

9. A method for generating a printer malfunction report from a barcode image, the method comprising:
capturing an image of a barcode using an optical device, the barcode comprising a plurality of barcode bars;
creating a box to surround a barcode in the image, wherein the box comprises:
(i) a top edge perpendicular to the barcode bars and aligned with the top of the barcode bars and (ii) a bottom edge perpendicular to the barcode bars and aligned with the bottom of the barcode bars;
detecting unprinted gaps along each barcode bar, the gaps indicative of a printer malfunction;
if possible, connecting the unprinted gaps to form lines that are substantially parallel to the top or bottom edge of the box, each line having a thickness to fill the corresponding unprinted gaps; and
if at least one line is formed, then generating a printer malfunction report comprising the number of lines formed.

10. The method according to claim 9, wherein a line is substantially parallel to the top or bottom edge of the box when the angle between the line and either the top or bottom edge of the box is less than five degrees.

11. The method according to claim 9, wherein a thickness of each line is measured in printer dot size.

12. The method according to claim 9, wherein the printer malfunction report comprises a calculation of the number of adjacent print-head elements that are malfunctioning based on a thickness of each line.

13. The method according to claim 9, wherein the printer malfunction report comprises guidance for repairing the malfunction.

14. The method according to claim 9, wherein the optical device is a barcode verifier.

15. The method according to claim 14, wherein the barcode verifier comprises a graphical user interface for displaying the printer malfunction report to a user.

16. The method according to claim 9, wherein the printer malfunction comprises an inoperative heating element in a print head for a thermal printer.

17. The method according to claim 9, wherein the printer malfunction comprises an inoperative jet in a print head for an inkjet printer.

18. The method according to claim 9, wherein the printer malfunction comprises an inoperative pin in a print head for a dot matrix printer.

19. The method according to claim 9, wherein the box created to surround a barcode comprises (i) a left edge parallel to the barcode bars and aligned with the outer edge of the first barcode bar and (ii) a right edge parallel to the barcode bars and aligned with the outer edge of the last barcode bar.

20. A barcode scanner for decoding barcodes and verifying barcodes, the barcode scanner comprising:
an imaging module for capturing an image of a label, the label comprising a user-data barcode symbol encoded with user data and a printer-ID barcode symbol encoded with a printer identity;
a memory communicatively coupled to the imaging module and configured to store the image and a barcode quality verification program; and
a processor communicatively coupled to the memory and configured by the barcode quality verification program to execute the ordered steps of:
(i) retrieving the image from the memory, (ii) identifying unprinted dots in the user-data barcode symbol, (iii) determining a printer malfunction using the unprinted dots, (iv) locating the printer-ID barcode symbol in the image, (v) decoding the printer-ID barcode symbol, and (vi) creating a printer malfunction report comprising the printer malfunction and the printer identity.

* * * * *